(12) United States Patent
Armstead et al.

(10) Patent No.: US 10,295,054 B2
(45) Date of Patent: May 21, 2019

(54) METHOD AND CONTROL FOR OPERATING TRANSMISSION DURING CLUTCH FAILURE WHEN SHIFTING FROM GEAR TO NEUTRAL

(71) Applicant: Ford Global Technologies, LLC, Dearborn, MI (US)

(72) Inventors: John Randall Armstead, Farmington Hills, MI (US); Stephen Michael Cicala, Dearborn Heights, MI (US); Alexander Phillip McDonnell, Dexter, MI (US); Dongdong Dee Li, Canton, MI (US); Conor Edward Sullivan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 15/783,273

(22) Filed: Oct. 13, 2017

(65) Prior Publication Data

US 2018/0119806 A1    May 3, 2018

Related U.S. Application Data

(60) Provisional application No. 62/414,187, filed on Oct. 28, 2016.

(51) Int. Cl.
| | |
|---|---|
| *F16H 61/12* | (2010.01) |
| *F16H 3/66* | (2006.01) |
| *F16H 61/02* | (2006.01) |
| *F16H 59/14* | (2006.01) |
| *F16H 59/56* | (2006.01) |
| *F16H 59/68* | (2006.01) |

(Continued)

(52) U.S. Cl.
CPC ............... *F16H 61/12* (2013.01); *F16H 3/66* (2013.01); *F16H 61/0213* (2013.01); *F16H 59/56* (2013.01); *F16H 59/72* (2013.01); *F16H 59/78* (2013.01); *F16H 2059/147* (2013.01); *F16H 2059/148* (2013.01); *F16H 2059/6807* (2013.01); *F16H 2059/6823* (2013.01); *F16H 2061/122* (2013.01); *F16H 2061/1244* (2013.01); *F16H 2061/1276* (2013.01); *F16H 2200/0069* (2013.01); *F16H 2200/2012* (2013.01); *F16H 2200/2043* (2013.01); *F16H 2200/2046* (2013.01); *F16H 2200/2066* (2013.01); *F16H 2200/2082* (2013.01)

(58) Field of Classification Search
USPC .......................................................... 701/62
See application file for complete search history.

(56) References Cited

U.S. PATENT DOCUMENTS

| | | |
|---|---|---|
| 5,046,175 A | 9/1991 | Lentz et al. |
| 5,721,682 A | 2/1998 | Arai et al. |
| 7,421,326 B2 | 9/2008 | Thor et al. |

(Continued)

*Primary Examiner* — Dirk Wright

(74) *Attorney, Agent, or Firm* — Dave Kelley; Brooks Kushman P.C.

(57) ABSTRACT

A vehicle includes a transmission having a first neutral with a first combination of engaged clutches and a second neutral with a second combination of engaged clutches. The first neutral has more engaged clutches than the second. A controller is programmed to, in response to a request to shift from a drive gear to the first neutral and a clutch of the drive gear being failed-on, shift to the second neutral.

20 Claims, 5 Drawing Sheets

(51) Int. Cl.
*F16H 59/72* (2006.01)
*F16H 59/78* (2006.01)

(56) References Cited

U.S. PATENT DOCUMENTS

| | | | |
|---|---|---|---|
| 7,769,516 B2 * | 8/2010 | Kondo | F16H 61/143 |
| | | | 701/51 |
| 8,162,796 B2 | 4/2012 | Popp et al. | |
| 8,538,647 B2 | 9/2013 | Sahashi et al. | |
| 10,113,639 B2 * | 10/2018 | Kline | F16H 61/0213 |
| 2004/0073350 A1 * | 4/2004 | Nagata | F16H 61/12 |
| | | | 701/62 |
| 2018/0119805 A1 * | 5/2018 | Cicala | F16H 61/0213 |
| 2018/0119806 A1 * | 5/2018 | Armstead | F16H 61/0213 |

* cited by examiner

METHOD AND CONTROL FOR OPERATING TRANSMISSION DURING CLUTCH FAILURE WHEN SHIFTING FROM GEAR TO NEUTRAL

CROSS-REFERENCE TO RELATED APPLICATIONS

This application claims the benefit of U.S. provisional application Ser. No. 62/414,187 filed Oct. 28, 2016, the disclosure of which is hereby incorporated in its entirety by reference herein.

TECHNICAL FIELD

This disclosure relates to the field of automatic transmissions for motor vehicles. More particularly, the disclosure relates to controls and methods for detecting clutch failure and to operating the clutches of the transmission in response to a detected clutch failure.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. A transmission speed ratio is the ratio of input-shaft speed to output-shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Most transmissions are equipped with a torque converter or other type of launch device. When the vehicle is stationary or moving very slowly, the gearbox input speed is less than the minimum operating speed of the engine. A launch device transmits torque from the engine to the gearbox input while permitting the engine to rotate at an acceptable speed. A torque converter includes an impeller driven by the engine and a turbine driving the gearbox. Torque is transferred from the impeller to the turbine hydrodynamically.

Automatic transmissions include several modes including PARK, REVERSE, NEUTRAL, and DRIVE. The driver selects between the different modes using an input, e.g., a shifter, located in the passenger cabin. The transmission includes clutches and brakes operable to create one or more gear ratios associated with one or more of the modes. For example, the transmission may include five forward-drive gear ratios associated with DRIVE, a single reverse gear ratio associated with REVERSE, and one or more neutral states associated with NEUTRAL and PARK.

Some transmissions are capable of having multiple neutral states in which different combinations of clutches and/or brakes are locked while still achieving NEUTRAL. U.S. Pat. No. 8,162,796 discloses this type of transmission.

SUMMARY

The transmission controller, or other vehicle controller, controls gear-to-neutral shifts. Depending upon transmission conditions, the controller may command the gear box from GEAR to a first neutral state, or may commend the gear box from GEAR to a second neutral state.

According to an embodiment, a vehicle powertrain includes an engine having a crankshaft and a transmission having a gear box having a plurality of clutches and planetary gear sets. The transmission has a first neutral state in which a first combination of the clutches are engaged, a second neutral state in which a second combination of the clutches are engaged, and at least one drive gear in which a third combination of the clutches are engaged. The first neutral state has a greater number of engaged clutches than the second neutral state, and the drive gear includes a greater number of engaged clutches than the first neutral state. The vehicle powertrain also includes a torque converting having an impeller fixed to the crankshaft and a turbine fixed to an input shaft of the gear box. A controller is programmed to, in response to the transmission requesting the gearbox to be shifted from the drive gear to the first neutral state, checking a series of conditions, and in response to the series of conditions being satisfied, command the gear box to the first neutral state. The controller is further programmed to, in response to the command to the first neutral state, begin releasing an offgoing clutch of the third combination. If slip is detected on the offgoing clutch, then the gearbox is shifted to the first neutral state, and if slip is not detected on the offgoing clutch, then the gearbox is shifted to the second neutral state.

According to another embodiment, a vehicle includes a transmission having a first neutral with a first combination of engaged clutches and a second neutral with a second combination of engaged clutches. The second neutral has more engaged clutches than the first neutral. A vehicle controller is programmed to, in response to a request to shift from the first to the second neutral and a failed-on clutch being detected, inhibit the shift to remain in the first neutral.

According to yet another embodiment, a vehicle includes a transmission having a drive gear ratio (drive) established by a set of engaged clutches, a first neutral established by releasing a first clutch of the set, and a second neutral established by releasing the first clutch and a second clutch of the set. A controller is programmed to (i) command a shift from drive to the first neutral, and (ii) command a shift from drive to the second neutral in response to slip not being detected on the first clutch.

DETAILED DESCRIPTION

Figure 1:
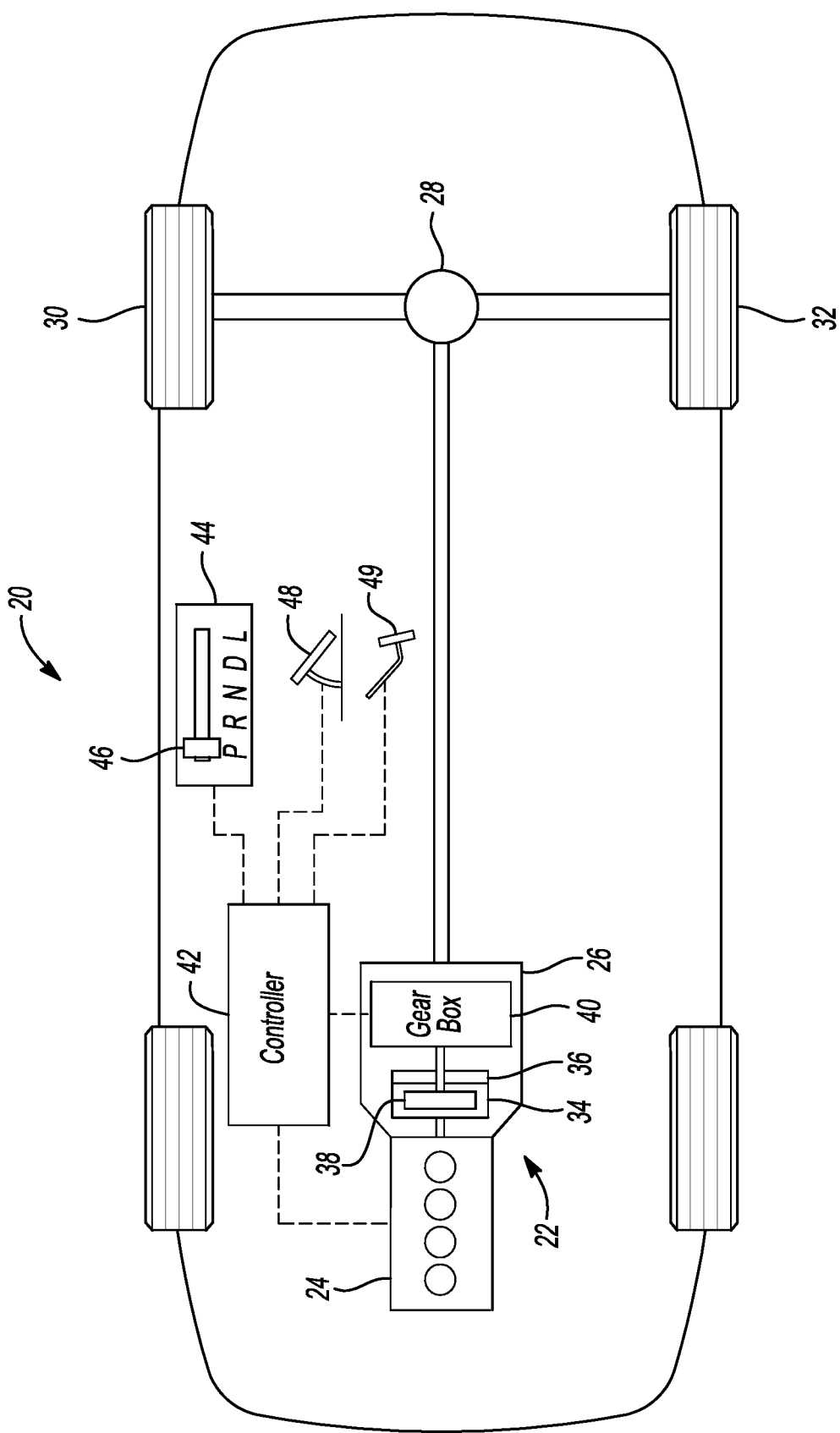
FIG. 1 is a schematic diagram of a rear-wheel-drive vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An example vehicle 20 includes a powertrain 22 having an engine 24 and a transmission 26. While illustrated as rear-wheel drive, the teachings of this disclosure are equally applicable to front-wheel drive, four-wheel drive, or all-wheel drive vehicles. The engine 24 generates mechanical power. The transmission 26 transmits the power to a differential 28 at a shaft speed suited to current vehicle needs, which may be faster or slower than the shaft speed at which the engine 24 generates the power. The differential 28 reduces the shaft speed by a fixed final-drive ratio and transmits the power to the left and right driving wheels 30 and 32, allowing for slight speed differences between the wheels as the vehicle turns a corner.

The transmission 26 may include a torque converter 34 or other launch device and a gearbox 40. The torque converter 34 includes an impeller 36 that is fixed to the engine crankshaft and a turbine 38 that is fixed to the gearbox input shaft. Torque is transferred hydro-dynamically from the impeller 36 to the turbine 38 when the impeller rotates faster than the turbine. A bypass clutch may be engaged to transfer torque by friction from the impeller 36 to the turbine 38 to reduce the power loss inherent in the hydrodynamic power transfer. The gearbox 40 includes a number of shift elements. The shift elements may be clutches. A clutch that holds an element against rotation by selectively connecting the element to the transmission housing may be called a brake. Used herein, the term "clutch" is generic and includes clutches and brakes. The gearbox 40 establishes different speed ratios by engaging various subsets of the shift elements. In some embodiments, a transmission pump provides pressurized fluid that engages the shift elements, which are hydraulically controlled by a valve body according to signals sent by the controller 42.

The controller 42 may be a vehicle-based computing system that includes one or more controllers that communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers. An example of a vehicle-based computing system is the SYNC system manufactured by THE FORD MOTOR COMPANY.

The transmission 26 may include a manually-operated gear selector 44 (also known as a gear shifter) that includes at least PARK, REVERSE, NEUTRAL, and DRIVE positions. The gear selector 44 is linked to the transmission 26 (either electrically or mechanically) to place the transmission in the mode selected by the driver. In the example shifter 44, a lever 46 rides within a mode channel, and the driver slides the lever 46 within the channel to place the lever in the desired position, e.g., DRIVE. The PRNDL modes may be arranged in series and require the lever to move through one or more of these modes when changing a mode of the transmission. For example, shifting to PARK from DRIVE requires the lever 46 to travel through NEUTRAL and REVERSE. Of course, other types of gear shifters exist such as pushbuttons, column mounted, and turn dials. The gear shifter 44 may include a lever-position sensor configured to send a signal to the controller 42 indicative of the lever position.

An accelerator pedal 48 provides operator input to control a speed of the vehicle 20. The engine 24 has an electronically controlled throttle body. The pedal 48 may include a pedal-position sensor that provides a pedal-position signal to the controller 42, which provides control signals to the throttle body and other engine components. The controller 42 may use the pedal-position signal to determine a driver-demanded torque (also known as an engine-torque request). The driver-demanded torque may also be generated by the controller 42 independent of the pedal-position signal.

A brake pedal 49 provides operator input to control the friction brakes of the vehicle. The brake controller receives operator input through the brake pedal 49, and controls a friction brake system, which is operable to apply a braking force to the vehicle wheels. In some embodiments, the pedal 49 may include a pedal-position sensor that provides a pedal-position signal to the controller 42. In other embodiments, the brake system is purely mechanical.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission, such as transmission 26 has a shiftable gearing arrangement disposed in the gear box 40. The shiftable gearing arrangement selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one-way clutches.

Figure 2:
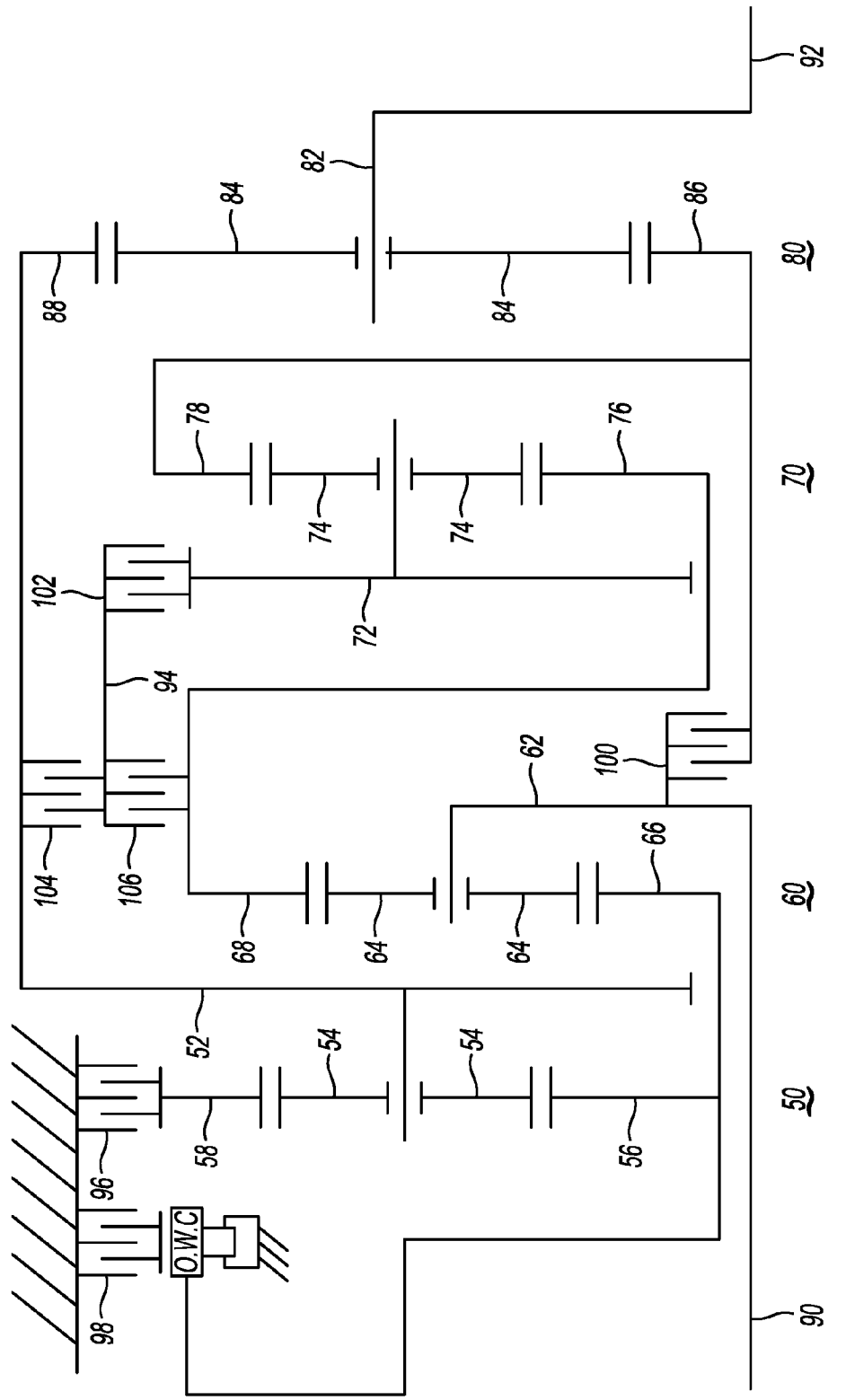
FIG. 2 is a schematic diagram of a transmission of the vehicle of FIG. 1.

The example transmission 26 is schematically illustrated in FIG. 2. The transmission 26 may utilize four simple planetary gear sets 50, 60, 70, and 80. A simple planetary gear set is a type of fixed gearing arrangement. A planet carrier 52 rotates about a central axis and supports a set of planet gears 54 such that the planet gears rotate with respect to the planet carrier. External gear teeth on the planet gears mesh with external gear teeth on a sun gear 56 and with internal gear teeth on a ring gear 58. The sun gear and ring gear are supported to rotate about the same axis as the carrier. A simple planetary gear set imposes a fixed speed relationship. The speed of the carrier is constrained to be between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier. Gear sets 60, 70, and 80 are similarly structured.

An example ratio of gear teeth for each planetary gear set is listed in Table 1.

TABLE 1

| | |
|---|---|
| Ring 58/Sun 56 | 2.20 |
| Ring 58/Sun 66 | 1.75 |
| Ring 58/Sun 76 | 1.60 |
| Ring 58/Sun 86 | 3.70 |

In the example transmission of FIG. 2, sun gear 56 is fixedly coupled to sun gear 66, carrier 52 is fixedly couple to ring gear 88, ring gear 68 is fixedly coupled to sun gear 76, ring gear 78 is fixedly coupled to sun gear 86, input shaft 90 is fixedly coupled to carrier 62, and output shaft 92 is fixedly coupled to carrier 82. Ring gear 58 is selectively held against rotation by clutch 96, and sun gears 56 and 66 are selectively held against rotation by clutch 98. Input shaft 90 is selectively coupled to ring gear 78 and sun gear 86 by clutch 100. Intermediate shaft 94 is selectively coupled to carrier 72 by clutch 102, selectively coupled to carrier 52 and ring gear 88 by clutch 104, and selectively coupled to ring gear 68 and sun gear 76 by clutch 106.

As shown in Table 2, engaging the clutches in combinations of four establishes ten forward speed ratios and one reverse speed ratio between input shaft 90 and output shaft 92. An X indicates that the clutch is required to establish the speed ratio. An (X) indicates the clutch can be applied but is not required. In $1^{st}$ gear, either clutch 104 or clutch 106 can be applied instead of applying clutch 102 without changing the speed ratio. When the gear sets have tooth numbers as indicated in Table 1, the speed ratios have the values indicated in Table 2.

TABLE 2

| | 96 | 98 | 100 | 102 | 104 | 106 | Ratio | Step |
|---|---|---|---|---|---|---|---|---|
| Rev | X | X | | X | X | | −4.79 | 102% |
| $1^{st}$ | X | X | X | (X) | | | 4.70 | |
| $2^{nd}$ | X | X | | X | | X | 2.99 | 1.57 |
| $3^{rd}$ | X | | X | X | | X | 2.18 | 1.37 |
| $4^{th}$ | X | | | X | X | X | 1.80 | 1.21 |
| $5^{th}$ | X | | X | | X | X | 1.54 | 1.17 |
| $6^{th}$ | X | | X | X | X | | 1.29 | 1.19 |
| $7^{th}$ | | | X | X | X | X | 1.00 | 1.29 |
| $8^{th}$ | | X | X | X | X | | 0.85 | 1.17 |
| $9^{th}$ | | X | X | | X | X | 0.69 | 1.24 |
| $10^{th}$ | | X | | X | X | X | 0.64 | 1.08 |

The transmission 26 also includes several neutral states that each has a unique combination of engaged shift elements. Table 3 shows several possible neutral states. Table 3 is not an exhaustive list of all of the possible neutral states of the transmission 26. In one embodiment, transmission 26 has 36 different neutral states.

TABLE 3

| Neutral State | 96 | 98 | 100 | 102 | 104 | 106 |
|---|---|---|---|---|---|---|
| 1 | X | X | | X | | |
| 2 | | X | X | | | |
| 3 | X | | X | | | |
| 4 | X | | | | | |
| 5 | | | | | | |

The transmission 26 may shift between the various neutral states when the transmission is in PARK or NEUTRAL depending upon operating conditions. This type of shift may be referred to as a neutral-to-neutral shift (N2N shift). The transmission 26 may also shift from DRIVE or REVERSE (generically referred to herein as "GEAR") to one of the neutral states depending on operating conditions.

The number of engaged clutches for the different neutral states varies. For example, Neutral State 1 includes three engaged clutches (highest neutral state). This may be referred to as three-clutch neutral. "Highest neutral state" refers to a neutral state that has one less engaged clutch than is required for GEAR. Since example transmission 26 requires four engaged clutches for gear, the highest neutral state is three-clutch neutral. Neutral State 2 includes two engaged clutches. This may be referred to as two-clutch neutral. Neutral State 4 includes one engaged clutch. This may be referred to as one-clutch neutral. Neutral State 5 has no clutches that are engaged (lowest neutral state). This may be referred to as zero-clutch neutral.

The transmission 26 typically requires four clutches to be engaged to achieve drive or neutral. (The one-way clutch in combination with 3 engaged clutches places the transmission in GEAR for select ranges of speeds.) Since three-clutch neutral is only one engaged clutch away from GEAR, the transmission is able to shift from NEUTRAL to GEAR faster than from a two-clutch neutral for example. As such, it is advantageous for the transmission to be in three-clutch neutral whenever possible to improve shifting response times. But, the transmission can only be in three-clutch neutral when the disengaged state of all other clutches are verified as actually disengaged. If, for example, a clutch is failed-on ("failed-ON" refers to a clutch that is supposed to be disengaged but is actually engaged), three-clutch neutral is not advisable as the failed-on clutch would place the transmission in GEAR while the driver is requesting NEUTRAL or PARK.

A failed-on clutch can cause problems in at least two different scenarios: 1) when shifting from a lower neutral state to a higher neutral state, and 2) when shifting from GEAR to NEUTRAL or PARK.

Appreciable torque is not transmitted from the input shaft to the output shaft when the transmission is in neutral. Transmission 26 includes multiple neutral states, and the transmission at least periodically shifts between these neutral states to achieve optimal transmission performance. These shifts must be completed without transmitting driving torque to the transmission output shaft. Failure to remain in NEUTRAL during N2N shifts can cause vehicle movement, hardware failures and other undesirable consequences. Moreover, remaining in NEUTRAL during N2N shifts must be maintained in the event of a transmission failure including control errors and hardware failures.

In some neutral states, such as Neutral States 2, 1 or 0, it is difficult to detect a clutch failure as the transmission is still in NEUTRAL despite one or more clutches being failed-on. If the transmission is shifted from two-clutch neutral to three-clutch neutral with a single clutch failed-on, the transmission 26 will shift to GEAR instead of to a different neutral state. Similarly, if the transmission 26 is shifted from one-clutch neutral to two-clutch neutral with two clutches failed-on the transmission will enter GEAR. It is to be understood that the teachings of this disclosure are applicable to transmission that require more or less than four engaged clutches to achieve GEAR. For example, if a transmission requires three engaged clutches to achieve GEAR and the transmission is shifted from one-clutch neutral to two-clutch neutral with a clutch failed-on, the transmission will enter GEAR.

Traditionally, transmissions included a manual valve that allowed the control system to immediately remove pressure from all of the clutches. In some embodiments, however, transmission 26, does not include a manual valve. Thus, control strategies must be developed to prevent inadvertently shifting from NEUTRAL to GEAR.

To prevent inadvertent shifts from NEUTRAL to GEAR, the transmission control system may monitor for indications that a clutch is failed-on. In response to a N2N shift, monitoring and verification control systems begin in an unverified state. While in this unverified state, the transmission is inhibited from shifting in order to avoid potentially moving the transmission to an engaged state. The control system can use transmission sensors to monitor for expected slip across off clutches and offgoing clutches in order to verify a successful N2N shift. While it may not be possible to calculate speeds of certain elements in certain neutral states, if shifting to a neutral state that is one failed clutch away from being engaged state, it is at least possible to measure slip across the clutches that would result in the error state.

Criteria has been developed to determine that a shift is successful. The criteria must be met to avoid declaring false failures. One criteria is that the torque capacity on the oncoming clutch must be significantly high. Due to internal drag, off clutches or offgoing clutches may remain at zero slip speed despite not transmitting any torque. The transfer of torque to the oncoming clutch creates different torque across the remaining off clutches. If the clutch is not holding any torque capacity, this results in driving slip across the clutch. A second criteria is that the off and offgoing clutches in the N2N shift must exhibit slip. Slip across the clutch indicates there is sufficiently low capacity on the clutch such that it will not allow appreciable torque to be transferred to the output shaft of the transmission. The transmission is allowed to progress to its next desired state if the N2N shift has been verified successful by meeting at least the above criteria.

The control system may include transmission sensors to monitor the clutches in order to identify a failure during a neutral-to-neutral shift. The transmission may also use torque sensors or other available sensors to determine useful information regarding the shift. The transmission 26 may include three or more speed sensors used to calculate the slip-state of the clutches. The speed sensors may be used to calculate oncoming-clutch capacity. If commanded torque capacity on an oncoming clutch is sufficiently high, or slip across the oncoming clutch is sufficiently low, the desired N2N shift is nearing completion. If this occurs without declaration of a successful shift, the neutral to neutral shift is declared failed.

One of the speed sensors may measure the speed of the turbine. The sensor may be used to determine the torque of the turbine. If the turbine torque is high, this suggests that the transmission is engaging and starting to transmit torque to the output shaft. The neutral-to-neutral shift is declared failed if this occurs.

The transmission controller may monitor the slip across the torque converter. When in NEUTRAL, the torque converter slip should be near zero as the turbine is free to spin without being loaded by the gear box. If the measured slip across the torque converter increases, this indicates that the turbine is being loaded by the gearbox input, which is likely due to an unexpected engagement within the gearbox. If this occurs, the N2N shift is declared failed.

Another sign of transmission failure is rapid deceleration in turbine speed. A likely cause of turbine deceleration is load being placed on the turbine shaft by a failed-on clutch.

Another sign of transmission failure is if slip is not detected across the OFF clutches. If after a threshold time, no slip is detected across OFF clutches that could carry torque to the output, it is likely the clutch is failed-on, or an unexpectedly large amount of drag torque in the transmission is present.

If a clutch failure is detected, then the transmission is shifted to a lower neutral state to ensure that torque is not transmitted to the output shaft. For example, the transmission may be shifted to a two-clutch neutral rather than to a three-clutch neutral. In the unlikely event that multiple clutches fail, controls may be programmed to shift to a zero-clutch neutral or one-clutch neutral depending upon how many failed clutches are detected and how many engaged clutches are required for GEAR.

Control logic or functions performed by controller 42 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 42. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
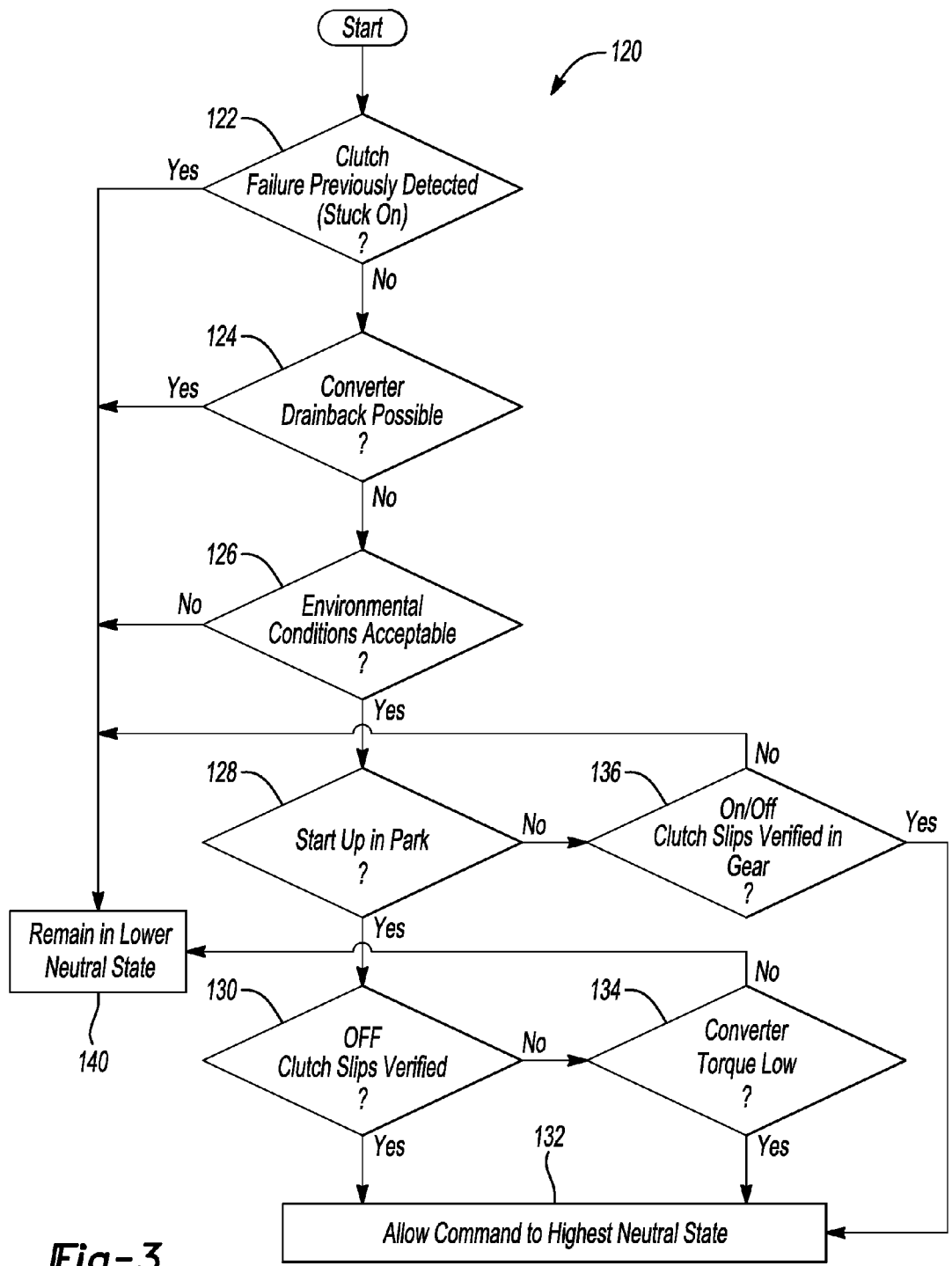
FIG. 3 is a flow chart illustrating an algorithm for controlling a neutral-to-neutral shift.
Figure 4:
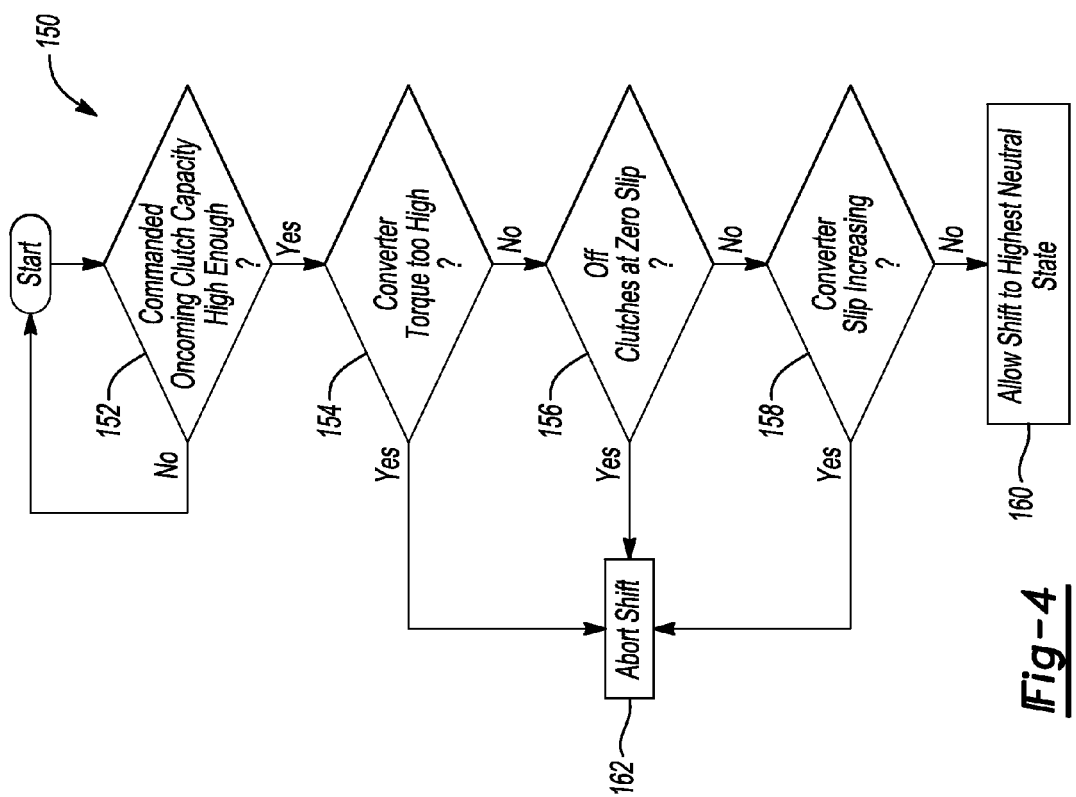
FIG. 4 is a flow chart illustrating an algorithm for monitoring the clutches of the transmission during a neutral-to-neutral shift.

FIGS. 3 and 4 illustrate example algorithms for controlling the transmission 26 during N2N shifts. FIG. 3 illustrates an algorithm for commanding an N2N shift to the highest neutral state, i.e., one clutch away from GEAR. In example transmission 26, this is a three-clutch neutral such as Neutral State 1. FIG. 4 illustrates an algorithm for monitoring the clutches of the transmission during an N2N shift.

Referring to FIG. 3, an algorithm 120 starts by determining if clutch failure was previously detected at operation 122. If no, control passes to operation 124 and the controller determines if torque converter drain-back is possible. Torque converter drain-back is when oil drains from the hydrodynamic chamber of the torque converter. Factors for determining the probability of converter drain-back include soak time (i.e., the length of time the vehicle rests with the engine OFF), low turbine speed during engine start up, high slip across the torque converter, time from engine start, and others. If the soak time exceeds a threshold and the engine run time is less than a threshold, then control passes to operation 140 and the transmission remains in the lower neutral state. Control also passes to operation 140 if other drain-back conditions are detected and the engine run times are less than a threshold. If the probability of torque converter drain-back is low, then control passes to operation 126 and the controller determines if environmental conditions of the transmission are acceptable for shifting to a highest neutral state, e.g., a three-clutch neutral. Environmental conditions include engine temperature, transmission temperature, driver-demanded torque, vehicle speed, and others.

Control passes to operation 128 if the environmental conditions are acceptable. At operation 128, the controller determines if the vehicle was in PARK when the engine was started. If yes, control passes to operation 130 and the controller verifies that the off clutches are slipping. This may be determined by using one or more of the speed sensors located within the transmission 26. If the off clutches are slipping, control passes to operation 132, and the controller commands the transmission to one of the highest neutral states, e.g., Neutral State 1.

If the answer to operation 130 is no, control passes to operation 134, and the torque at the torque converter is monitored prior to allowing or disallowing the N2N shift command. If the torque at the torque converter is low, i.e., torque is less than a threshold torque, then the N2N shift is commanded at operation 132. If the torque at the torque converter is greater than or equal to the threshold torque, then control passes to operation 140 and the transmission remains in a lower neutral state.

If the controller determines at operation 128 that the engine was started in a position other than PARK, control passes to operation 136 and the controller verifies the slip-states for the ON and OFF clutches. If the controller verifies the correct slip states for the clutches, control passes to operation 132 and the N2N shift is commanded. If the slips states cannot be verified at operation 136, then control passes to operation 140 and the transmission remains in the lower neutral state.

The transmission will also proceed to operation 140 and remain in the lower neutral state, or shift to another lower neutral state, if any of the following occurs: previous clutch failure was detected at operation 122, high probability of torque converter drain-back determined at operation 124, or the environmental conditions were not acceptable at operation 126.

Referring to FIG. 4, if the controller commands a N2N shift at operation 132 control passes to a monitoring module that executes algorithm 150 that either allows the shift to occur or aborts the shift. In response to the N2N shift being commanded at operation 126, one of the clutches begins to engage. The clutches may be hydraulically actuated clutches that are engaged by commanding a valve body to flow oil to a supply chamber of the piston associated with that clutch. In one example, the transmission may be N2N shifting from Neutral State 2 to Neutral State 1 by closing clutch 96. In this example, the controller would determine if the clutch capacity of clutch 96 exceeded a threshold value at operation 152. If no, control loops back to the start. If yes, control passes to operation 154 and the torque at the torque converter is determined. If the torque-converter torque exceeds a threshold value, control passes to operation 162 and the shift is aborted as high converter-torque torque is indicative of a failed-on clutch. If the shift is aborted at 162, the transmission may be commanded back to the neutral state from which it was shifting, i.e., Neutral State 2 in this example, or may be shifted to another neutral state that is known to be safe. This may be done by stopping oil flow to the clutch, i.e., clutch 96, that was being engaged to shift to the new neutral state.

If no at operation 154, control passes to operation 156 and the controller determines if the slip-state of the disengaged clutches are at or near zero. If the disengaged clutches are not slipping, this is indicative of a failed-on clutch and control passes to operation 162 to abort the shift. If no at operation 156, control passes to operation 158 and the controller determines if the torque-converter slip is increasing or decreasing. Increasing torque converter slip is indicative of a failed-on clutch, and if it is sensed, control passes to operation 162. If no at operation 158, then the engage states for each of the clutches has been sufficiently verified to allow the transmission to complete the shift to the new neutral state, which occurs at operation 160. In this example, transmission 26 is shifted to Neutral State 1 at operation 160.

As explained above, the vehicle may include one or more torque sensors within the transmission. One of the torque sensors may be configured to measure torque of the transmission output shaft. When the transmission is in neutral, the output shaft should have nominal torque. If the torque sensor measures an output-shaft torque above a threshold, this is indicative of a failed-on clutch. Thus, the controller may be programmed to inhibit a N2N shift in response to the torque sensor measuring a torque of the output shaft above a threshold.

The transmission controller also verifies that each of the clutches are in their correct state when shifting from GEAR to NEUTRAL or PARK. It is important for a transmission to be able to disconnect the input shaft from the output shaft to remove driving torque to the rear wheels in response to a request for NEUTRAL or PARK from the driver or from the controller. The transmission should be able to quickly disengaged to a neutral state to reduce the amount of torque transferred once the command is received. Failure to timely disengage the output shaft from the input shaft can result in hardware damage and other undesirable consequences. Moreover, this requirement must be met even in the event of a controller error or hardware failure.

As explained above, in many situations it is advantageous to shift the transmission to the highest neutral state possible for that given condition. In transmission 26, which requires four engaged clutches for most forward and reverse gears, this means shifting to a three-clutch neutral by releasing a single clutch. If, however, a fifth clutch is failed-on, the transmission 26 will not shift to three-clutch neutral when a clutch is released, but rather will shift from one drive gear to another. To prevent this from happening, the transmission includes control logic to verify the engagement states of the clutches prior to shifting from GEAR to NEUTRAL or PARK. Note: If a fifth clutch is failed-on, the transmission may in a tie-up state prior to the attempted shift into neutral. A complete tie-up (extra clutch engaged with high capacity) would act like engaging PARK—no torque to output and no movement is allowed. If the fifth clutch is only partially ON, the output torque would be reduced from the intended gear, but not zero.

Two potential failure cases may occur during a GEAR to NEUTRAL shift as explained below. First failure case: the commanded offgoing clutch fails to disengage despite actuating the clutch to the disengaged position. In this case, the transmission remains in the same drive gear despite the transmission commanding a shift to NEUTRAL or PARK. Second failure case: another clutch, that is expected to be in the disengaged state, is failed-on. If unmitigated, the transmission shifts from the current drive gear to another drive gear once the commanded disengaging clutch releases, rather than shifting to NEUTRAL or PARK as requested.

Drive-to-neutral shifts typically occur when the vehicle is stationary. When vehicle speed is zero, it is difficult to differentiate before a disengagement occurs whether the transmission has one or more clutches failed-on. Thus, the transmission may be programmed to begin shifting from GEAR to a highest neutral state, and if a failure condition is detected during the shift, shift to a lower neutral state by releasing additional clutches. The controls may include logic to determine which additional clutches to release based on the combination of currently engaged clutches of the drive gear that is being shifted from.

When transmission disengagement is requested, the control system begins to monitor for indications of successful disengagement and for indications of unsuccessful disengagement. The monitoring and verification control system begins in an unverified state. The transmission may be inhibited from engaging any additional clutches when in this unverified state to avoid potentially moving to an uncommanded GEAR.

The control system can use inputs from one or more of the speed sensors and other sensors of the transmission 26 to monitor for the achievement of a neutral state. For example, the transmission may monitor the turbine speed of the torque converter, clutch slip speed, and clutch pressure.

The transmission may include a speed sensor at the turbine. Since the turbine is fixed to the transmission input shaft, measuring the turbine speed can be used to determine the input shaft speed. When the transmission is in an engage state, for any given gear, there should be a constant ratio of speeds between the transmission input shaft and the transmission output shaft. The transmission may include a speed sensor that measures the output shaft speed. A ratio change between the input and output speeds provides evidence of a successful disengagement of one or more of the clutches.

Further evidence of successful disengagement may be determined by measuring the slip speed of the offgoing clutch. Clutches should have a slip speed of zero when engaged. Thus, if a slip speed is detected at the disengaging clutch, it can be determined that the clutch is disengaged. The slip speed for the clutches can be calculated using one or more of the various speed sensors disposed in the gearbox.

As an additional check, the transmission control system may monitor the clutch pressure of the offgoing clutch. The offgoing clutch is held at a specific pressure while the transmission is in GEAR. The offgoing-clutch pressure is lowered when disengagement is commanded, which lowers the clutch capacity. When the clutch pressure reaches a sufficiently low value, this gives further evidence that the disengaging clutch has been released. Using these and other tests, the transmission may declare the disengagement successful and allow the transmission to progress to its next desired state, such as shifting from a GEAR to NEUTRAL.

The controller of the transmission can use speed sensors and other sensors disposed within the transmission to monitor for a clutch failure during a disengagement. The control logic may be able to not only detect a failed clutch but also pinpoint which of the clutches is failed-on.

In addition to monitoring successful disengagement of the clutches as described above, the control system also monitors for failure during disengagement. The controller may monitor the speed sensors to determine clutch slip speeds. When the transmission is disengaging from the GEAR to a neutral state, holding torques on the other clutches that remain engaged during the disengagement typically change. A failed clutch will have a different torque split across the clutches than expected. If the torque split outside the normal range is detected, this gives indication that the desired disengagement has failed.

The controller can also monitor timing to determine if clutches are failed-on. Under a given condition, the disengagement typically occurs within a threshold amount of time after it is requested. If the threshold time has passed (plus or minus a margin) and the transmission has failed to disengage, a disengagement failure is declared. In response to a disengagement failure being declared, a failure management action can be triggered to put the transmission into a safe state.

Figure 5:
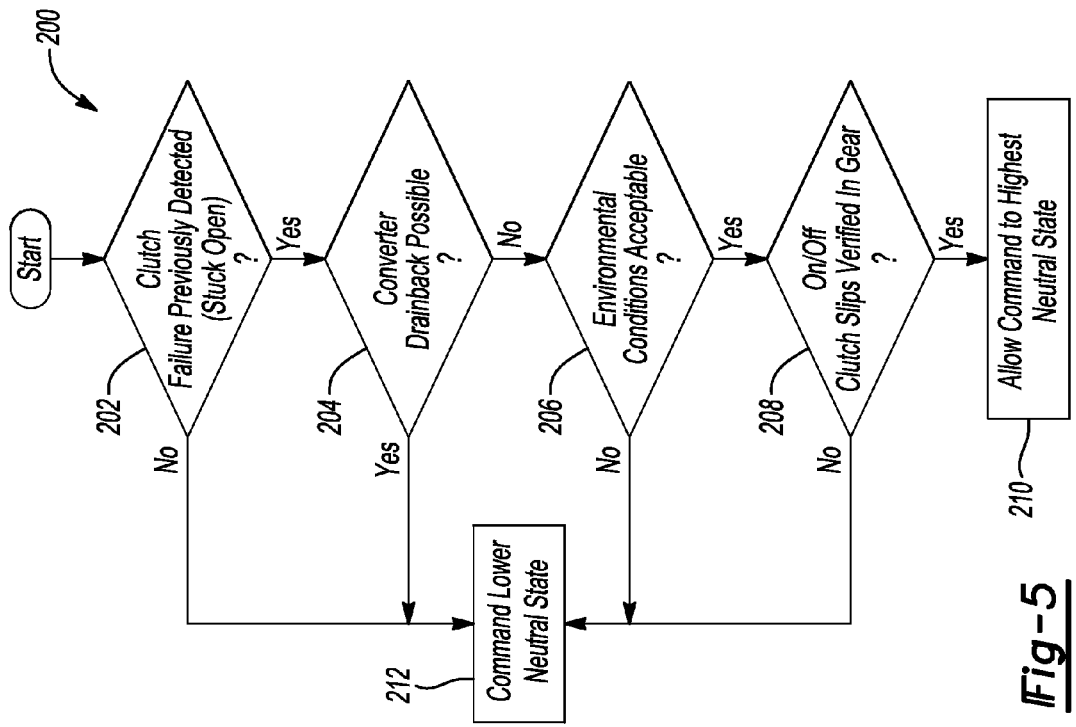
FIG. 5 is a flow chart illustrating an algorithm for commanding a shift to neutral state.
Figure 6:
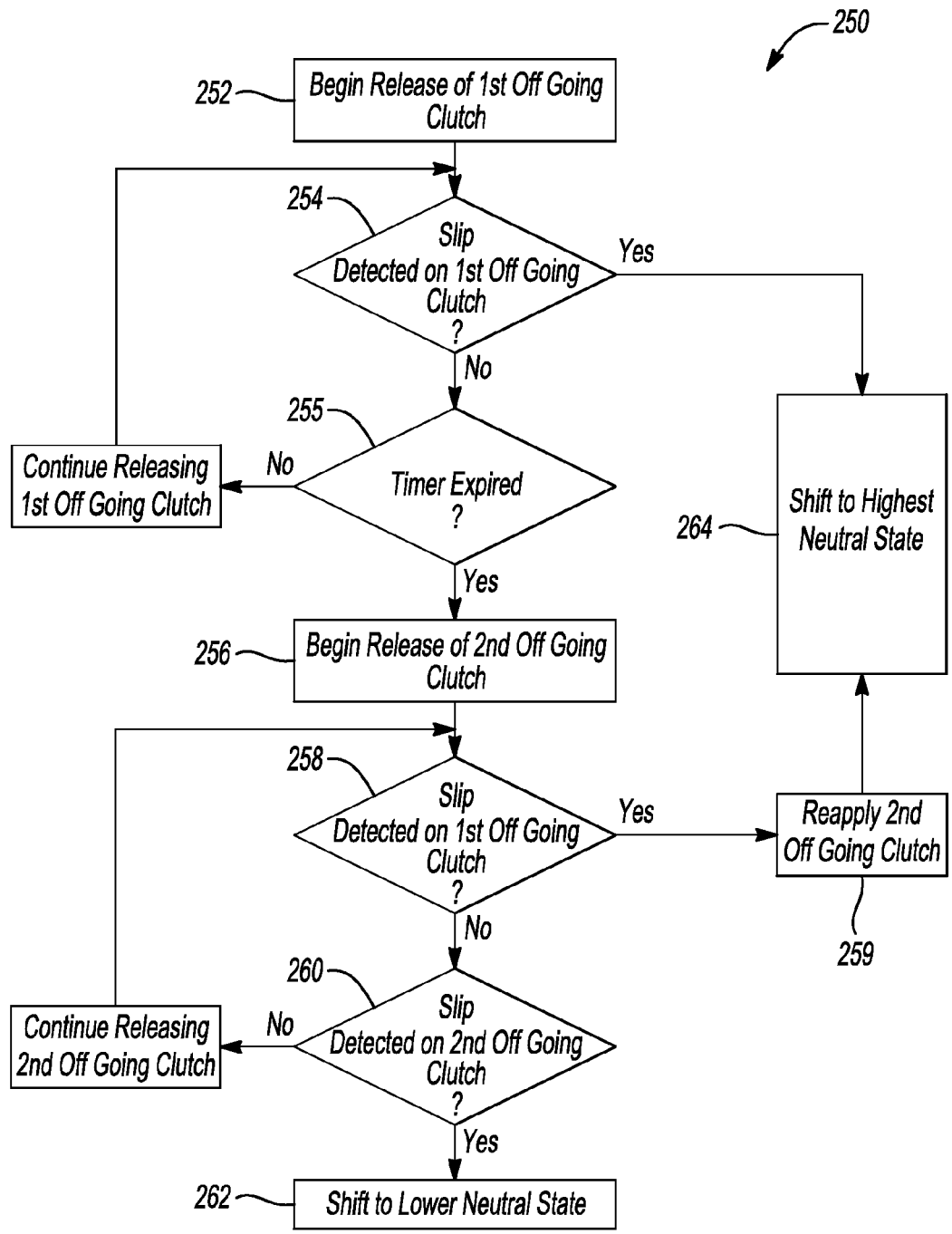
FIG. 6 is a flow chart illustrating an algorithm for monitoring the clutches of the transmission during a disengagement shift.

FIGS. 5 and 6 illustrate example algorithms for controlling a transmission during gear-to-neutral or gear-to-park shifts. FIG. 5 illustrates an algorithm for commanding a shift to a highest neutral state. FIG. 6 illustrates an algorithm for monitoring the clutch of the transmission during the shift.

Referring to FIG. 5, an algorithm 200 starts by determining if clutch failure was previously detected at operation 202. If no, control passes to operation 204 and the controller determines the probability of torque converter drain-back. If the probability of torque converter drain-back is below a threshold value, then control passes to operation 206 and the controller determines if environmental conditions of the transmission are acceptable. These conditions include transmission temperature, driver-demanded torque, vehicle speed, and others. If these conditions are acceptable, control passes to operation 208 where the controller verifies the slips of the on/off clutches.

At operation 210, the controller allows the command to shift the transmission to a highest neutral state. In transmission 26, this would be a three-clutch neutral since transmission 26 generally engages when four of the clutches are engaged. In other transmissions, such as a transmission that requires three gears to engage, the controller may command the transmission to two-clutch neutral at operation 210.

If the controller detects a possible failed condition, at operations 202 through 208, control passes to operation 212. At operation 212, the controller commands the transmission to a lower neutral state, which may vary depending upon the design of the transmission. If the transmission requires four clutches to engage GEAR, then the transmission may be commanded to a two clutch neutral at operation 212. If, however, the transmission only requires three gears to engage, a one-clutch neutral may be commanded at operation 212. A more detailed explanation of operations 202 through 208 can be found in FIG. 3 and the associated text.

If the controller commands a shift at operation 210, control passes to a monitoring module that executes algorithm 250 (FIG. 6) that either allows the shift to the highest neutral state or aborts the shift by shifting to a lower neutral state. In response to the shift being commanded at operation 210, the first offgoing clutch begins to be released at operation 252.

At operation 254, the controller determines if slip is detected on the first offgoing clutch. If yes, the shift is successful and the first offgoing clutch is fully released to shift the transmission to one of the highest neutral states at operation 264.

If no, control passes to operation 255 and the controller determines if a timer has expired. The timer measures the amount of time that has passed since operation 252. In many transmissions, the clutches are hydraulically actuated and do not respond instantaneously. Thus, the timing step provides time for the clutches to react. If the timer has not expired, the release of the first clutch continues and the controls cycle through operation 254 to check if the clutch has released. If the first clutch releases prior to expiration of the timer, then control passes to operation 264 to shift the transmission to one of the plurality of highest neutral states.

If the first clutch fails to release within the allotted time, control passes to operation 256, and the controller commands release of an additional offgoing clutch. At operation 258, the controller determines if slip is detected on the first offgoing clutch. If yes, control passes to operation 259 and the controller reapplies the second off going clutch causing the transmission to shift to the highest neutral state at 264.

If no, control passes to operation 260, and the controller determines if slip is detected on the second offgoing clutch. If yes at operation 260, the controller has determined that a failure has occurred in releasing the first clutch. In response to the detected failure, the controller commands a lower neutral state at operation 262 by completely releasing the second clutch. In example transmission 26, the transmission may be commanded to a two-clutch neutral at operation 262.

If slip is not detected on the second offgoing clutch at operation 260 the controller will wait according to a timer operation similar to that described above for the first clutch. If the second clutch fails to release within the allotted time, control passes to another operation (not shown) and a third offgoing clutch begins releasing. If the second clutch slips after releasing the third clutch, then the second clutch is reapplied (similar to operation 259) to shift to the lower neutral state at operation 262. If the second clutch does not begin slipping in response to a third clutch being released, then the transmission continues to release the third clutch to shift the transmission into a lower neutral state that has less engaged clutches than the neutral state of operation 262.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A vehicle comprising:
   a transmission including a drive gear ratio (drive) established by a set of engaged clutches, a first neutral established by releasing a first clutch of the set, and a second neutral established by releasing the first clutch and a second clutch of the set; and
   a controller programmed to (i) command a shift from drive to the first neutral, and (ii) command a shift from drive to the second neutral in response to slip not being detected on the first clutch.

2. The vehicle of claim 1, wherein the controller is further programmed to command shifting directly from drive to the second neutral in response to a previously detected clutch failure.

3. The vehicle of claim 1, wherein the controller is further programmed to command shifting directly from drive to the second neutral in response to temperature of the transmission being below a threshold temperature.

4. The vehicle of claim 1 further comprising an engine coupled to the transmission, wherein the controller is further programmed to command shifting directly from drive to the second neutral in response to temperature of the engine being below a threshold temperature.

5. The vehicle of claim 1 further comprising:
   an engine; and
   a torque converter connected to the engine and the transmission, wherein the controller is further programmed to command shifting directly from drive to the second neutral in response to a soak time of the torque converter exceeding a threshold time and a run time of the engine being less than a second threshold time.

6. The vehicle of claim 1 further comprising speed sensors disposed in the transmission, and wherein the slip of each of the first and second clutches is detected based on data measured by the speed sensors.

7. A vehicle comprising:
   a transmission having a first neutral with a first combination of engaged clutches and a second neutral with a second combination of engaged clutches, the first neutral having more engaged clutches than the second; and
   a controller programmed to, in response to a request to shift from a drive gear to the first neutral and a clutch of the drive gear being failed-on, shift to the second neutral.

8. The vehicle of claim 7, wherein the controller is further programmed to, in response to a request to shift from the drive gear to the first neutral and slip being detected on an offgoing clutch of the drive gear, shift to the first neutral.

9. The vehicle of claim 7, wherein the drive gear is established by a third combination of engaged clutches that includes all of the engaged clutches of the first combination plus a single additional engaged clutch.

10. The vehicle of claim 9, wherein the first combination includes all of the clutches of the second combination plus a single additional clutch that is included in the third combination.

11. The vehicle of claim 9, wherein the transmission is shifted from the drive gear to the first neutral by releasing a single clutch of the third combination.

12. The vehicle of claim 11, wherein the transmission is shifted from the drive gear to the second neutral by releasing a pair of clutches of the third combination, wherein one of the pair of clutches is included in the first combination and the other of pair of clutches is not included in the first combination.

13. The vehicle of claim 7, wherein the failed-on clutch is not part of the second combination of engaged clutches.

14. The vehicle of claim 7, wherein the controller is further programmed to, in response to a request to shift from the drive gear to the first neutral, release an engaged clutch of the drive gear and, in response to slip being detected on the engaged clutch that was released, shift the transmission to the first neutral.

15. A vehicle comprising:
a transmission including a drive gear established by a set of engaged clutches; and
a controller programmed to
command release of a first clutch of the set to shift the transmission from the drive gear to a first neutral, and
command release of a second clutch of the drive gear, responsive to slip not being detected on the first clutch within a threshold time, to shift to a second neutral.

16. The vehicle of claim 15, wherein the controller is further programmed to, in response to the second clutch being released and slip subsequently being detected on the first clutch, reapply the second clutch to shift to the first neutral.

17. The vehicle of claim 15, wherein the controller is further programmed to command release of a third clutch of the drive gear in response to slip not being detected on the second clutch to shift to a third neutral.

18. The vehicle of claim 15, wherein the controller is further programmed to remain in the first neutral in response to slip being detected on the first clutch.

19. The vehicle of claim 15, wherein the controller is further programmed to command shifting directly from the drive gear to the second neutral in response to a temperature of the transmission being below a threshold temperature.

20. The vehicle of claim 15 wherein the transmission further includes a torque converter, and wherein the controller is further programmed to command shifting directly from the drive gear to the second neutral in response to a drain-back condition of the torque converter being detected.

* * * * *